United States Patent
Bogenrieder et al.

(10) Patent No.: US 9,016,720 B2
(45) Date of Patent: Apr. 28, 2015

(54) AIRBAG FOR A MOTOR VEHICLE

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/637,606

(22) PCT Filed: Feb. 10, 2011

(86) PCT No.: PCT/EP2011/000633
§ 371 (c)(1),
(2), (4) Date: Nov. 20, 2012

(87) PCT Pub. No.: WO2011/120607
PCT Pub. Date: Oct. 6, 2011

(65) Prior Publication Data
US 2013/0200602 A1 Aug. 8, 2013

(30) Foreign Application Priority Data
Mar. 27, 2010 (DE) .......................... 10 2010 013 174

(51) Int. Cl.
 *B60R 21/20* (2011.01)
 *B60R 21/30* (2006.01)
 *B60R 21/239* (2006.01)

(52) U.S. Cl.
 CPC ............... *B60R 21/20* (2013.01); *B60R 21/30* (2013.01); *B60R 2021/2395* (2013.01)

(58) Field of Classification Search
 CPC ...... B60R 21/272; B60R 21/276; B60R 21/30
 USPC ....................... 280/728.2, 738, 739, 740, 742
 See application file for complete search history.

(56) References Cited

U.S. PATENT DOCUMENTS

| | | | | |
|---|---|---|---|---|
| 3,773,351 A * | 11/1973 | Catanzarite | ................... | 280/738 |
| 3,801,127 A * | 4/1974 | Katter et al. | .................. | 280/738 |
| 3,909,037 A * | 9/1975 | Stewart | ......................... | 280/738 |
| 3,910,595 A * | 10/1975 | Katter et al. | .................. | 280/732 |
| 3,938,826 A * | 2/1976 | Giorgini et al. | ............... | 280/738 |
| 4,043,572 A * | 8/1977 | Hattori et al. | ................. | 280/738 |
| 4,817,828 A | 4/1989 | Goetz | | |
| 4,928,991 A * | 5/1990 | Thorn | ......................... | 280/738 |

(Continued)

FOREIGN PATENT DOCUMENTS

| | | |
|---|---|---|
| DE | 37 33 436 A1 | 4/1988 |
| EP | 1 279 574 A1 | 1/2003 |

OTHER PUBLICATIONS

International Search Report with English translation dated Jul. 5, 2011 (four (4) pages).

(Continued)

*Primary Examiner* — Nicole Verley
(74) *Attorney, Agent, or Firm* — Crowell & Moring LLP

(57) ABSTRACT

An airbag for a motor vehicle, having a housing and at least one restraining element, which has at least one receptacle space for a gaseous medium, in particular air, and which can be moved, in the case of an accident-induced application of force to the motor vehicle, into a restraining position by the flowing of medium into the receptacle space from a storage position within the housing. At least one wall of the housing has at least one inflow opening for the medium.

16 Claims, 3 Drawing Sheets

(56) References Cited

U.S. PATENT DOCUMENTS

Figure 1:
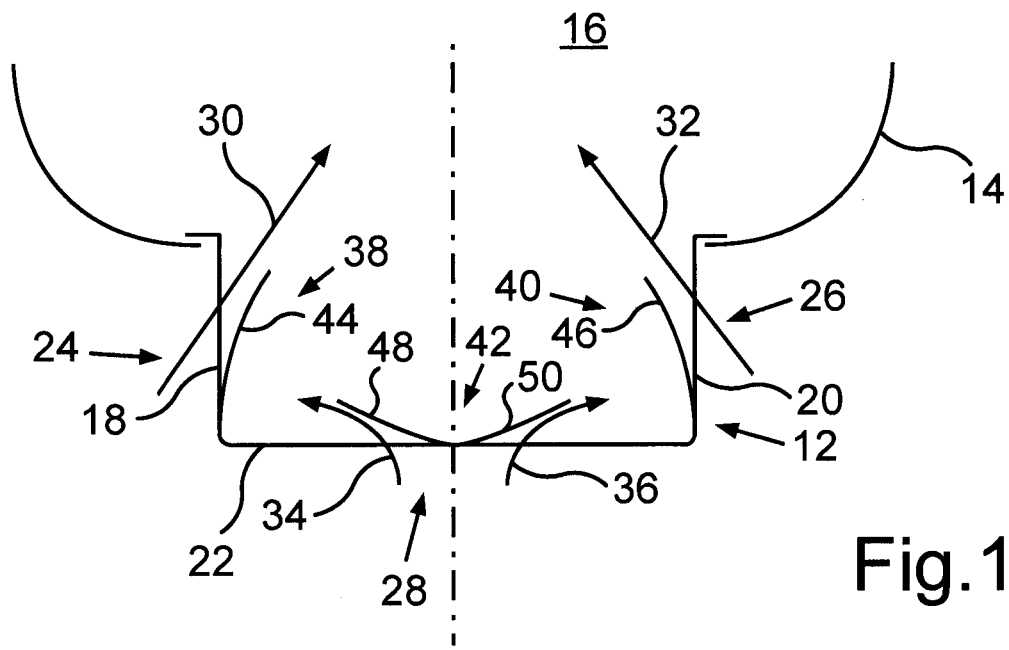

| | | | | |
|---|---|---|---|---|
| 5,100,172 A * | 3/1992 | VanVoorhies et al. | | 280/738 |
| 5,207,450 A * | 5/1993 | Pack et al. | | 280/738 |
| 5,226,670 A * | 7/1993 | Wright et al. | | 280/738 |
| 5,358,272 A * | 10/1994 | Kokeguchi | | 280/738 |
| 5,437,473 A * | 8/1995 | Henseler | | 280/738 |
| 5,489,117 A * | 2/1996 | Huber | | 280/738 |
| 5,507,520 A * | 4/1996 | Meduvsky et al. | | 280/741 |
| 5,542,695 A * | 8/1996 | Hanson | | 280/729 |
| 5,692,768 A * | 12/1997 | Mihm et al. | | 280/728.2 |
| 5,816,612 A * | 10/1998 | Faigle et al. | | 280/740 |
| 6,213,496 B1 * | 4/2001 | Minami et al. | | 280/729 |
| 6,227,566 B1 * | 5/2001 | Kusaka et al. | | 280/738 |
| 7,040,653 B1 * | 5/2006 | Breed | | 280/731 |
| 7,264,268 B2 * | 9/2007 | Ehrke | | 280/729 |
| 7,325,830 B2 * | 2/2008 | Higuchi et al. | | 280/738 |
| 7,618,059 B2 * | 11/2009 | Hall et al. | | 280/736 |
| 7,726,684 B2 * | 6/2010 | Breed | | 280/729 |
| 7,744,122 B2 * | 6/2010 | Breed | | 280/731 |
| 8,047,572 B2 * | 11/2011 | Carter et al. | | 280/753 |
| 8,191,926 B2 * | 6/2012 | Schneider | | 280/739 |
| 8,196,952 B2 * | 6/2012 | Walston et al. | | 280/728.2 |
| 8,226,116 B2 * | 7/2012 | Yoo | | 280/739 |
| 8,641,092 B2 * | 2/2014 | Barthel et al. | | 280/742 |
| 2004/0256842 A1 * | 12/2004 | Breed | | 280/730.1 |
| 2008/0007031 A1 | 1/2008 | Choi | | |
| 2008/0272579 A1 * | 11/2008 | Breed et al. | | 280/728.2 |

OTHER PUBLICATIONS

Form PCT/ISA/237 (six (6) pages).

* cited by examiner

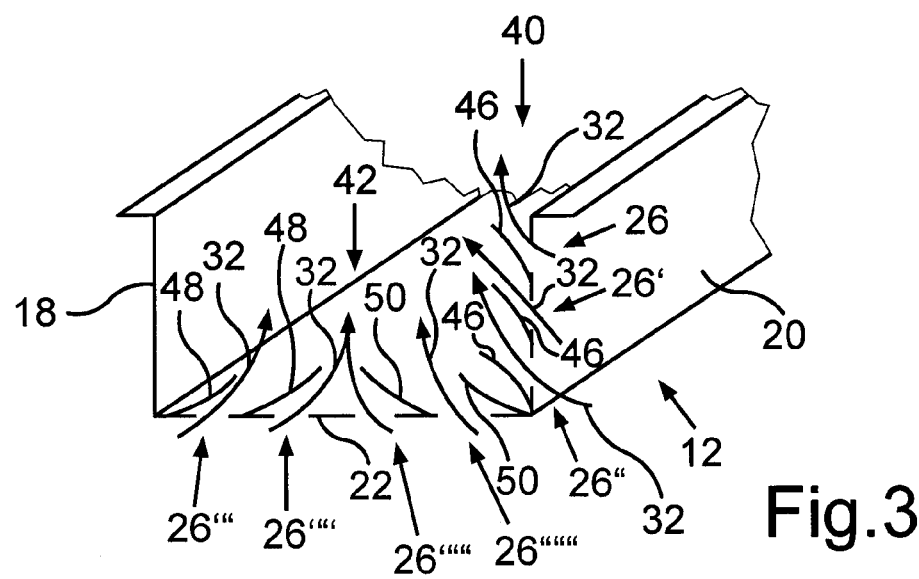
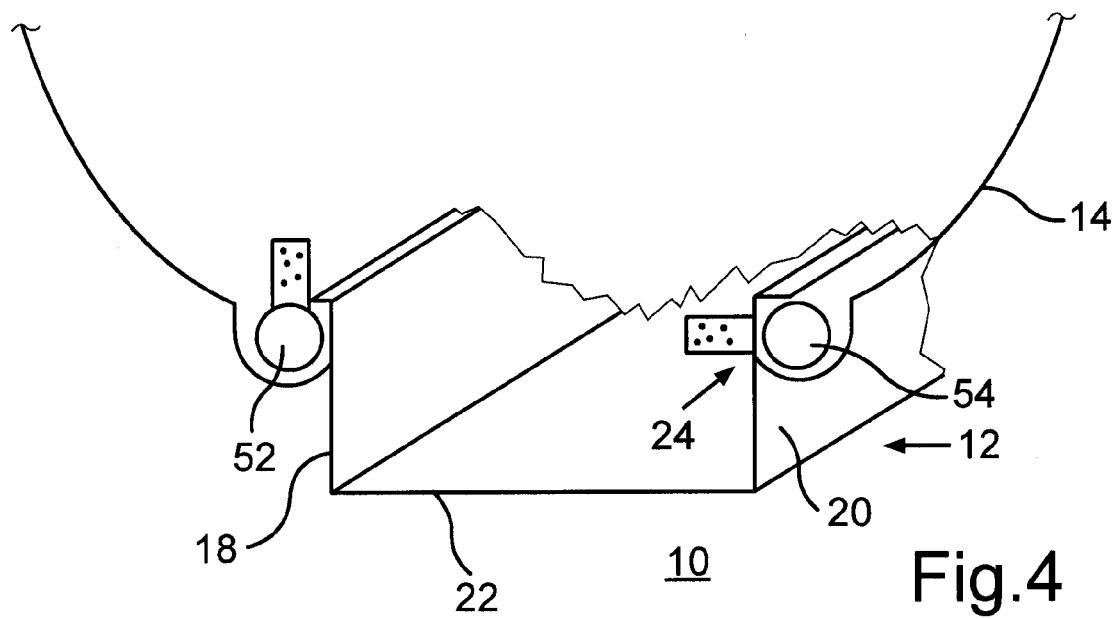

AIRBAG FOR A MOTOR VEHICLE

BACKGROUND AND SUMMARY OF THE INVENTION

The invention relates to an airbag for a motor vehicle.

Such airbags are known and comprise an inflatable volume element for restraining occupants of the motor vehicle. The volume element comprises an inner space, into which a gaseous medium is introduced in order to move the volume element from a storage position into a restraint position to restrain the occupants. In order to guarantee optimum protection of occupants it is advantageous to inflate the volume element in a particularly short time. The faster it is inflated from its storage position into its restraint position the better the restraining function, as it can then take up a particularly large volume in an inner space of the motor vehicle in order to restrain the occupants.

Exemplary embodiments of the present invention are directed to an airbag for a motor vehicle that guarantees very good occupant protection.

In accordance with exemplary embodiments of the present invention an airbag for a motor vehicle comprises a housing and at least one restraint element comprising at least one receiving area for a gaseous medium, in particular air, said restraint element being movable in case of an accident-related force impact of the motor vehicle from a storage position within the housing into a restraint position through inflow of the medium into the receiving area. This means that the restraint element in the storage position is housed at least in areas in the housing, from which it can be moved from the storage position into the restraint position, in which the restraint element takes up a particularly large volume in an inner space of the motor vehicle in order to thus guarantee a very good restraint of occupants in case of an accident.

If at least one wall of the housing comprises at least one inflow opening for the medium, through which the medium can flow into the receiving area of the restraint element, the restraint element can thereby be moved particularly quickly, i.e., in a particularly short time, from its storage position into its restraint position. This means that the restraint element, in case of an accident, can take up a particularly large space or a particularly large volume in the inner space of the motor vehicle in order to protect occupants from collision with hard components causing injury. This has a particularly good effect upon occupant protection in the motor vehicle. The probability of the occupants suffering serious injuries is thus lower.

The restraint element can thereby be designed as a large, cohesive air sack that can be inflated by medium flowing into the receiving area for movement from the storage position into the restraint position. The medium can be actively blown into the receiving area, for example, by means of a gas generator. Alternatively, the medium can be sucked into the receiving area through the airbag unfolding upon movement from the storage position into the receiving position.

In addition, the restraint element can be formed by a lattice-like supporting structure, which is optionally provided with a shell at least in areas, whereby the receiving area is formed. The lattice-like supporting structure is thereby formed, for example, from a plurality of tube elements that also have a respective further receiving area, into which a medium can flow, wherein the medium is actively introduced, in particular blown, for example by means of a gas generator, into the respective further receiving area of the tube elements. Through the inflation of the tube elements the lattice-like supporting structure unfolds from the storage position into the restraint position and takes up a particularly large volume in the inner space of the motor vehicle. A so-called lattice-like bag with this supporting structure has the advantage that the receiving areas of the tube elements in sum have a smaller total volume to be inflated than the whole supporting structure ultimately takes up in the inner space. This lattice-like bag can thus take up a particularly high volume in the inner space, wherein a relatively small volume must be actively inflated. The receiving area of the airbag, formed by the supporting structure and possibly the shell, is thereby likewise filled with a gaseous medium, in particular ambient air, in order to achieve a good supporting effect of the lattice-like bag. Through the inflow opening in the wall of the housing the medium for this receiving area can flow particularly well and particularly rapidly into the receiving area of the restraint element formed by the supporting structure and optionally the shell, wherein this restraint element can likewise be moved particularly rapidly, i.e., in a short time, from the storage position into the restraint position. This is also particularly beneficial for occupant protection as the lattice-like bag can then prevent contact of the occupants with solid components that may cause injury in many cases. Through the inflow opening in the wall a possible under-pressure in the restraint element or in the receiving area, which could impede unfolding of the restraint element and thus lengthen an inflation time, can be prevented or at least reduced.

In an advantageous embodiment of the invention the airbag comprises at least one valve mechanism, by means of which a through-flow of the medium through the inflow opening can be adjusted. The valve mechanism preferably comprises at least one passage position exposing the inflow opening at least in areas, in which passage position the medium can flow into the receiving area. Likewise, the valve mechanism preferably has a closed position closing the inflow opening at least in areas, in which closed position an outflow of the medium from the receiving area is at least substantially prevented. Thus, the valve mechanism facilitates a particularly rapid movement of the restraint element from the storage position into the restraint position while also providing a very long useful life of the restraint element.

If, in case of an accident, an occupant comes into contact with the restraint element the receiving area is compressed, which causes or would cause initially an outflow of the medium from the receiving area. Due to the fact that the valve mechanism at least substantially prevents such an outflow in the closed position, the restraint element offers a certain useful life that depends upon a cross-section of the inflow opening that is opened or closed by the valve mechanism. The occupant can thus be protected in case of an accident and accelerations causing injuries can be reduced, as the medium can flow more slowly out of the receiving area than it can or could flow into the receiving area in case of movement of the restraint element into the restraint position. The inflow opening can also optionally be closed by the valve mechanism to such an extent that the medium can at least virtually no longer flow from the receiving area. It is understood that in case of a large cross-section of the inflow opening exposed by the valve mechanism more air can flow out of the receiving area. This results in a shorter useful life than in a case in which the valve mechanism exposes a smaller cross-section of the inflow opening. This results in a longer useful life of the restraint element.

The valve mechanism comprises for example at least one flap element, by means of which the inflow opening can be at least partially exposed or closed. The flap element is formed for example at least substantially as a film, as a textile layer and/or at least substantially from plastic. If the flap element exposes the inflow opening in the passage position it closes it at least in areas in the closed position, whereby it is supported for example on the wall of the housing delimiting the inflow opening. A failure of the flap element is thereby avoided.

It should be noted at this point that a ventilation, i.e., an inflow of the medium into the receiving area and possibly a valve mechanism, by means of which the through-flow of the medium through the inflow opening can be adjusted, is realized particularly in case of airbags without housing in such a way that at least one such inflow opening is integrated into a textile layer as a fabric of the airbag and thus directly into the restraint element, thus for example into the large cohesive airbag or the supporting structure or the shell thereof.

BRIEF DESCRIPTION OF THE DRAWING FIGURES

Figure 2:
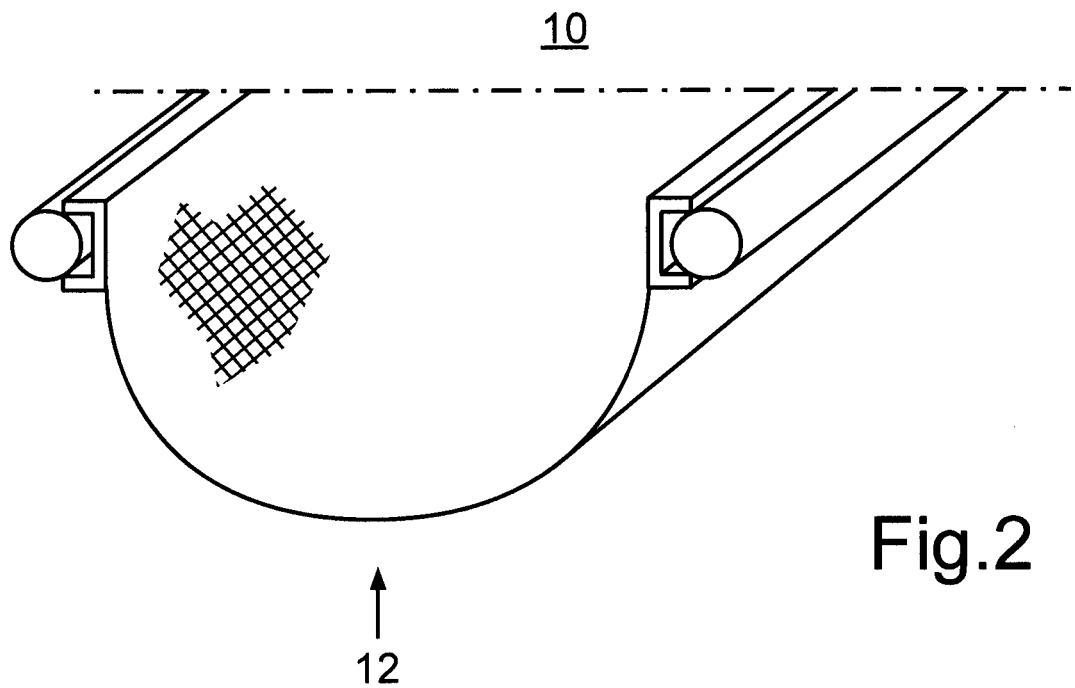
Figure 5:
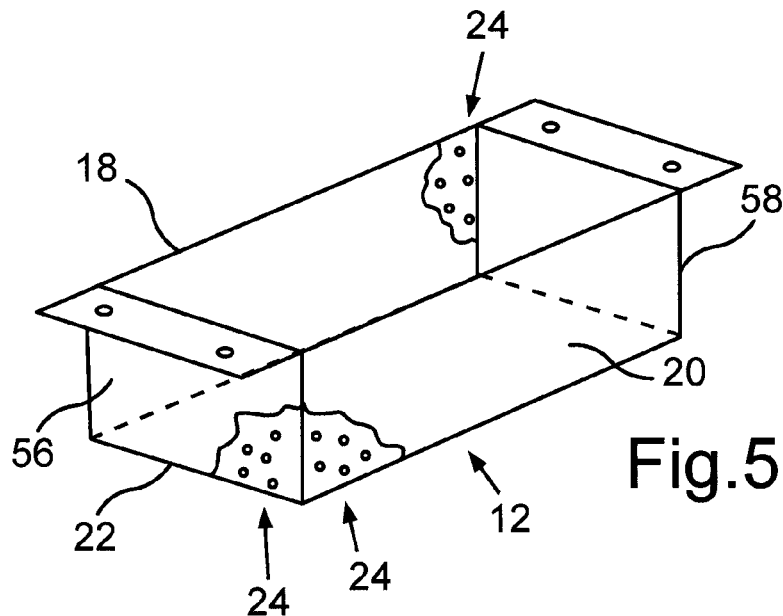
Figure 6:
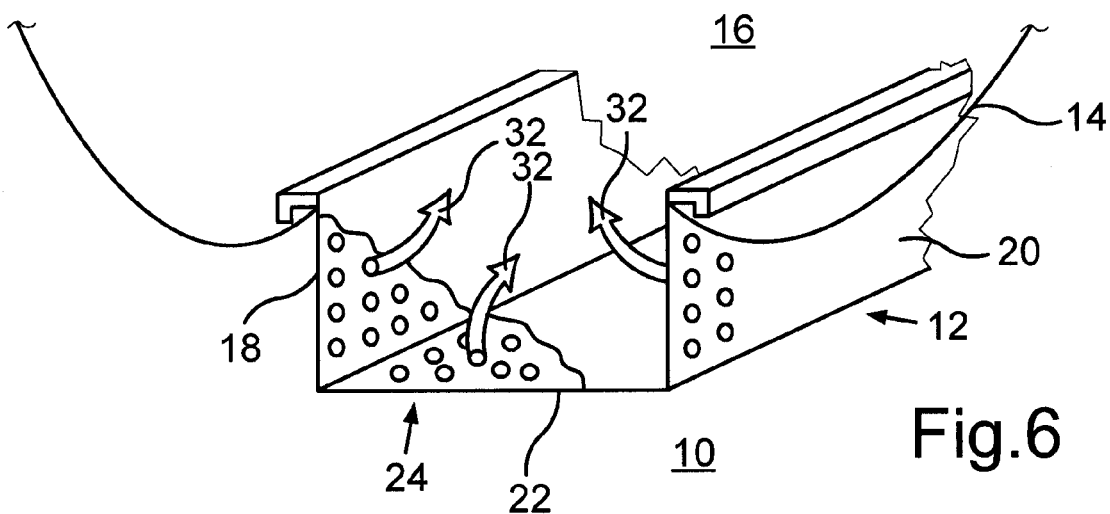
Figure 7:
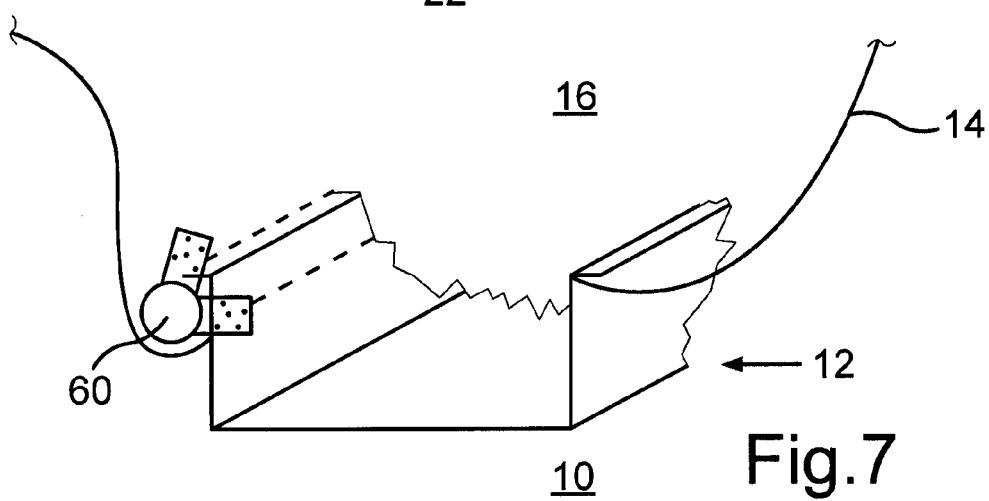

Further advantages, features and details of the invention follow from the following description of a plurality of preferred embodiments and by reference to the drawings. The features and feature combinations mentioned above in the description and the features and feature combinations mentioned in the following description of the drawings and/or shown solely in the drawings can be used not only in the respectively indicated combination but also in other combinations or alone without going outside of the scope of the invention. The drawings show:

FIG. 1 a schematic cross-sectional view of an airbag for a motor vehicle with a housing, wherein walls of the housing comprise inflow openings for a gaseous medium;

FIG. 2 in a cut-out, a schematic and perspective cross-sectional view of a housing of an alternative embodiment of an airbag according to FIG. 1;

FIG. 3 in a cut-out, a schematic and perspective cross-sectional view of a further embodiment of a housing according to FIG. 2;

FIG. 4 in a cut-out, a schematic cross-sectional view of a further embodiment of an airbag according to FIG. 1;

FIG. 5 a schematic and perspective view of a housing for an airbag according to FIGS. 2 and 3;

FIG. 6 in a cut-out, a schematic and perspective view of a further embodiment of an airbag according to FIGS. 1 and 4 with the housing according to FIG. 5; and FIG. 7 in a cut-out, a schematic and perspective view of a further embodiment of an airbag according to FIGS. 1, 4 and 6.

DETAILED DESCRIPTION

FIG. 1 shows an airbag 10 which comprises a housing 12 and a restraint element 14. The restraint element 14 is thereby shown in FIG. 1 in a restraint position, in which it takes up a very large volume in an inner space of a motor vehicle, whereby the restraint element 14 can restrain occupants particularly well and thus protect them in most cases from impact against components. The restraint element 14 can thereby be moved from a storage position into the restraint position shown in FIG. 1. In the storage position the restraint element 14 is received in the housing 12. In order to ensure particularly good occupant protection the restraint element 14 can be moved particularly rapidly, i.e., in a particularly short time, from the storage position into the restraint position. In this connection the restraint element 14 comprises a receiving area 16 that is delimited in areas through the restraint element 14 and in areas through the housing 12. Ambient air can flow into the receiving area 16 for movement of the restraint element 14 from the storage position into the restraint position.

In order to ensure that a particularly large amount of ambient air can flow into the receiving area 16 in a particularly short time, both side walls 18 and 20 and also a bottom 22 of the housing 12 comprise inflow openings 24, 26 and 28, through which the ambient air can flow according to direction arrows 30, 32, 34 and 36 into the receiving area 16.

In order to guarantee this inflow the airbag 10 comprises valve mechanisms 38, 40 and 42 with respective valve flaps 44, 46, 48 and 50. The valve mechanisms 38, 40 and 42 have a closed position, in which an outflow of the ambient air contrary to the direction arrows 30, 32, 34 and 36 is at least substantially prevented. Likewise they have an open position shown in FIG. 1, in which the inflow of air according to the direction arrows 30, 32, 34 and 36 is facilitated.

The valve mechanisms 38, 40 and 42 thus facilitate not only an inflow of a particularly large quantity of ambient air in a particularly short time into the receiving area 16 but also facilitate a long and advantageous useful life of the restraint element 14. This occurs because when an occupant impacts against the restraint element 10 the air in the receiving area 16 cannot flow or cannot flow unhindered out of the receiving area 16 contrary to the direction arrows 30, 32, 34 and 36. Unhindered outflow of the ambient air via the inflow openings 24, 26 and 28 is at least substantially prevented through the valve flaps 44, 46, 48 and 50 in the closed position.

As can be seen from FIG. 1, the valve flaps 44, 46, 48 and 50 lift in the open position from the side walls 24 and 26 and the bottom 22. If an inflow process of the ambient air into the receiving area has ended due to the unfolding restraint element 14 the valve flaps 44, 46, 48 and 50 again lie against the side walls 18 and 20 and the bottom 22, as the valve flaps 44, 46, 48, 50 are, for example, elastically formed and seek without force a state in which they lie against the side walls 24 and 26 and the bottom 22 and thus cover and close the inflow openings 24, 26 and 28. If an occupant contacts the restraint element 14 the inner pressure in the receiving area 16 increases and the valve flaps 44, 46, 48 and 50 are pressed even more greatly against the side walls 18 and 20 and the bottom 22. A controlled and defined outflow of the ambient air out of the receiving area 16, wherein a certain volume flow of the ambient air can flow out, is optionally desired in order to remove accelerations acting on the occupants. Such a volume flow is realized, for example, in that the inlet flows 24, 26 and 28 are only covered in areas by the valve flaps 44, 46, 48, 50 and these thus expose a certain cross-section of the inflow openings 24, 26 and 28. It is also possible to allow such an outflow of the ambient air out of the receiving area 16 through other openings, valve mechanisms or similar which are integrated for example into the restraint element 16.

FIG. 2 shows an alternative embodiment of the housing 12 which is formed from a metal grid and thus provides a plurality of inflow openings for the ambient air. A valve function for the plurality of inflow openings according to the valve mechanisms 38, 40 and 42 is provided, for example, by valve flaps which are formed from a film or films, fabric or fabrics or similar. It is also possible to form the housing 12 as a grill element or other perforated material. Plastic, sheet metal or other materials may be used FIG. 3 shows a further embodiment of the housing 12 with the side walls 18 and 20 and the bottom 22, wherein the side wall 20 comprises three inflow openings 26, 26' and 26". The bottom 22 comprises four inflow openings 26''', 26'''', 26''''' and 26''''''. A particularly large amount of ambient air can thereby flow according to direction arrows 32 into the receiving area 16.

FIG. 4 shows a further embodiment of the airbag 10, wherein the airbag 10 comprises gas generators 52 and 54.

The restraint element 14 comprising the receiving area 16 is formed as a so-called lattice-like bag which comprises a lattice-like-like supporting structure that is provided with a shell formed as fabric. In other words, the receiving area 16 is delimited by the supporting structure and by the shell as well as by the housing 12. The lattice-like supporting structure is in turn formed from a plurality of tube elements, which respectively comprise a receiving area, into which a gaseous medium is to flow or be blown in order to thus inflate the tube elements and thus the lattice-like supporting structure, whereby the restraint element 14 can be unfolded from the storage position received in the housing 12 into the restraint position shown in FIG. 4. For particularly rapid inflation of the tube elements, and thus of the supporting structure, the gas generator 52 blows the gaseous medium into the further receiving areas of the tube elements. In order to further support the unfolding of the restraint element 14 the gas generator 54 blows a gaseous medium via an inflow opening 24' of the side wall 20 of the housing 12 into the receiving area 16.

FIG. 5 shows a further embodiment of the housing 12 that comprises the side walls 18 and 20, the bottom 22 and end walls 56 and 58. As can be seen from the drawing, a plurality of inflow openings 24 are provided respectively in the side walls 18 and 20 and in the end wall 56, via which the gaseous medium, in particular ambient air, can flow into the receiving area 16 according to direction arrows 32, whereby this can be seen from FIG. 6.

FIG. 6 thereby shows a further embodiment of the airbag 10 with the housing 12 according to FIG. 5. As can be seen in FIG. 6, the bottom 22 of the housing 12 also comprises a plurality of inflow openings 24, through which ambient air can flow into the receiving area 16 upon movement of the restraint element 14 from the storage position into the restraint position.

FIG. 7 shows a further embodiment of the airbag 10 that comprises the housing 12 and the restraint element 14. Furthermore, the airbag 10 according to FIG. 4 comprises a gas generator 60, by means of which a gaseous medium can be blown both into the receiving area 16 and also into the tube elements described in connection with the airbag according to FIG. 4 in order to inflate the supporting structure which is in particular lattice-like.

It is understood that the indications concerning the restraint element 14 according to FIG. 4 also apply similarly to the airbags 10 according to FIG. 1, FIG. 6 and FIG. 7 and can be transferred and applied to their respective restraint elements 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag for a motor vehicle, the airbag comprising:
a housing;
at least one gas generator configured to generate a gaseous medium;
at least one receiving area configured to receive the gaseous medium; and
at least one restraint element comprising a lattice supporting structure formed from a plurality of inflatable tube elements and a fabric shell,
wherein the at least one receiving area is delimited by the lattice supporting structure, the fabric shell, and the housing,
wherein the at least one gas generator is arranged with respect to the at least one restraint element so that the at least one restraint element is configured to be moved, in case of an accident-related force impact of the motor vehicle, from a storage position within the housing into a restraint position through separate inflows of the gaseous medium into the at least one receiving area delimited by the lattice supporting structure, the fabric shell, and the housing and into receiving areas of the plurality of inflatable tube elements,
wherein at least one wall of the housing comprises at least one inflow opening to receive the gaseous medium.

2. The airbag according to claim 1, wherein the airbag comprises:
at least one valve mechanism by means of which a through-flow of the gaseous medium through the inflow opening can be adjusted.

3. The airbag according to claim 2, wherein the valve mechanism has at least one passage position exposing the inflow opening at least in areas, wherein the at least one passage position is configured so that the gaseous medium can flow into the receiving area.

4. The airbag according to claim 3, wherein the valve mechanism has a closed position closing the inflow opening at least in areas, wherein the closed position is configured so that an outflow of the gaseous medium out of the receiving area is at least substantially prevented.

5. The airbag according to claim 2, wherein the valve mechanism comprises at least one flap element configured so that the inflow opening can be exposed or closed, at least in areas.

6. The airbag according to claim 5, wherein the flap element is comprised at least substantially as a film.

7. The airbag according to claim 5, wherein the flap element is comprised at least substantially as a textile layer.

8. The airbag according to claim 5, wherein the flap element is comprised at least substantially from plastic.

9. The airbag according to claim 1, wherein the housing is configured as a grid or grill element.

10. The airbag according to claim 1, wherein the housing is comprised at least substantially from plastic or sheet metal.

11. The airbag according to claim 1, wherein at least one gas generator is a single gas generator.

12. The airbag according to claim 1, wherein at least one gas generator includes a first gas generator configured to blow the gaseous medium into the receiving areas of the plurality of inflatable tube elements and a second gas generator configured to blow the gaseous medium into the at least one receiving area.

13. The airbag according to claim 1, wherein the at least one gas generator is configured to blow the gaseous medium into the at least one receiving area of the at least one restraint element via the at least one inflow opening.

14. The airbag of claim 12, wherein the first gas generator is arranged entirely outside of the housing.

15. The airbag of claim 14, wherein the second gas generator is arranged with a portion outside of the housing and a portion passing through the at least one inflow opening and into the housing.

16. The airbag of claim 1, wherein the gaseous medium received by the at least one inflow opening is ambient air.

* * * * *